United States Patent
Machida

(10) Patent No.: US 8,335,436 B2
(45) Date of Patent: Dec. 18, 2012

(54) ELECTRONIC APPARATUS

(75) Inventor: Yuichi Machida, Kanagawa (JP)

(73) Assignee: Sony Corporation, Tokyo (JP)

( * ) Notice: Subject to any disclaimer, the term of this patent is extended or adjusted under 35 U.S.C. 154(b) by 485 days.

(21) Appl. No.: 12/432,472

(22) Filed: Apr. 29, 2009

(65) Prior Publication Data

US 2009/0285578 A1   Nov. 19, 2009

(30) Foreign Application Priority Data

May 15, 2008   (JP) .................................. 2008-128752

(51) Int. Cl.
*H04B 10/00* (2006.01)

(52) U.S. Cl. ........ 398/131; 398/130; 398/133; 398/201; 398/212

(58) Field of Classification Search .......... 398/130–134, 398/168, 169, 170, 212, 201, 114, 140
See application file for complete search history.

(56) References Cited

U.S. PATENT DOCUMENTS

| | | | | |
|---|---|---|---|---|
| 5,889,602 A * | 3/1999 | Johnson et al. | ................ | 398/131 |
| 5,949,565 A * | 9/1999 | Ishida | ............................ | 398/131 |
| 6,262,824 B1 * | 7/2001 | Sasaki et al. | ................... | 398/115 |
| 6,470,132 B1 * | 10/2002 | Nousiainen et al. | .......... | 385/146 |
| 7,140,785 B2 * | 11/2006 | Machida et al. | ................ | 385/92 |
| 7,338,193 B1 * | 3/2008 | Zeiger et al. | ................... | 362/551 |
| 7,353,049 B2 * | 4/2008 | Mizuta | ....................... | 455/575.3 |
| 7,480,427 B2 * | 1/2009 | Kufner et al. | ................... | 385/25 |
| 7,499,737 B2 * | 3/2009 | Mizuta et al. | .............. | 455/575.3 |
| 7,636,523 B2 * | 12/2009 | Schorpp | ........................ | 398/153 |
| 7,672,594 B2 * | 3/2010 | Mui et al. | ....................... | 398/142 |
| 7,796,848 B2 * | 9/2010 | Ueno et al. | ....................... | 385/25 |
| 7,873,279 B2 * | 1/2011 | Alameh et al. | ................... | 398/114 |
| 7,899,332 B2 * | 3/2011 | Shindou et al. | ............... | 398/114 |
| 8,224,137 B2 * | 7/2012 | Zeiger et al. | .................... | 385/25 |
| 8,267,598 B2 * | 9/2012 | Alameh et al. | .................. | 385/89 |
| 2006/0172786 A1 * | 8/2006 | Lo | ............... | 455/575.3 |
| 2007/0032275 A1 * | 2/2007 | Suzuki et al. | .............. | 455/575.3 |
| 2007/0153457 A1 * | 7/2007 | Hosoya et al. | ................ | 361/681 |
| 2007/0293283 A1 * | 12/2007 | Inubushi et al. | ........... | 455/575.1 |

FOREIGN PATENT DOCUMENTS

| | | |
|---|---|---|
| JP | 2000-194459 | 7/2000 |
| JP | 2002-157046 | 5/2002 |
| JP | 2003-348203 | 12/2003 |
| JP | 2004-508599 | 3/2004 |

(Continued)

OTHER PUBLICATIONS

European Search Report dated Apr. 7, 2010 corresponding to European Patent Appln. No. 09160205-2.

(Continued)

*Primary Examiner* — Kenneth N Vanderpuye
*Assistant Examiner* — Hibret Woldekidan
(74) *Attorney, Agent, or Firm* — K&L Gates LLP

(57) ABSTRACT

An electronic apparatus is provided and includes a light transmitting module configured to convert an electric signal into an optical signal and emit light, a light receiving module configured to receive the light emitted from the light transmitting module and convert the optical signal into an electric signal, and a mover unit configured to cause at least one of the light transmitting module and the light receiving module to carry out linear movement along an optical axis of the light emitted from the light transmitting module and/or rotation about the optical axis.

8 Claims, 20 Drawing Sheets

FOREIGN PATENT DOCUMENTS

| | | |
|---|---|---|
| JP | 2005-333019 | 12/2005 |
| JP | 2006-303719 | 11/2006 |
| JP | 2007-184676 | 7/2007 |
| JP | 2007-274057 | 10/2007 |
| JP | 2007-534242 | 11/2007 |

OTHER PUBLICATIONS

Japanese Office Action dated Mar. 2, 2010, for corresponding JP2008-128752.

* cited by examiner

ELECTRONIC APPARATUS

CROSS REFERENCES TO RELATED APPLICATIONS

The present application claims priority to that disclosed in Japanese Priority Patent Application JP 2008-128752 filed in the Japan Patent Office on May 15, 2008, the entire content of which is hereby incorporated by reference.

BACKGROUND

In recent years, as portable terminals such as cellular phones, ones having various structures such as a foldable (rotatable) structure and a slidable structure have been put into practical use. In the case of connecting components (circuit hoards) that can carry out rotation, linear movement, and so on to each other by a signal line, the components are electrically connected to each other e.g. by using a flexible cable and a harness and sliding the contact point.

For example, a portable terminal having an upper case and a lower case freely slidably coupled with each other is disclosed in Japanese Patent Laid-open No. 2006-303719 (Page 4, FIG. 1) (hereinafter, Patent Document 1). In the slidable portable terminal, the circuit board in the upper case and the circuit board in the lower case are electrically connected to each other by the flexible substrate. Furthermore, a communication device having an interface unit rotatably coupled with a casing via a hinge mechanism is disclosed in Japanese Patent Laid-open No. 2007-534242 (Page 7, FIG. 4) (hereinafter, Patent Document 2). In the rotatable communication device, the interface unit and the electronic circuit in the casing are electrically connected to each other by the electric cable provided in the arm.

In addition, a method of using optical communication has also been proposed as a method for data transmission. For example, an optical connector that includes a convex holder having a laser diode and a concave holder having a photodiode is disclosed in Japanese Patent Laid-open No. 2005-333019 (Page 6, FIG. 1) (hereinafter, Patent Document 3), In this optical connector, the concave holder is engaged with the convex holder, which allows optical communication.

However, these Patent Documents include the following problems.

(1) For the portable terminals disclosed in Patent Documents 1 and 2, the cable needs to be folded, twisted, and expanded/contracted in the rotation and sliding of the case, which causes a problem that a heavy load is applied to the bent part and the twisted part and therefore the endurance is lowered. In recent years, along with increase in the information transmission amount and enhancement in the transmission speed, increase in the number of signal lines, increase in the cable width and the diameter of a bundle of cables, reduction in the size per one cable, and so on are being advanced. Therefore, it is expected that the lowering of the endurance will lead to large problems.

(2) The method of sliding the contact point in the slidable portable terminal involves a problem that change in the mechanical load and electric signal noise occur due to change in the contact pressure.

(3) For the optical connector disclosed in Patent Document 3, operational restrictions are caused because communication is carried out with the convex holder engaged with the concave holder. Therefore, for example, it is difficult to carry out data transmission in the state in which a case like the above-described ones is rotated and slid.

There is a need to provide an electronic apparatus that is free from operational restrictions and has enhanced endurance and reliability.

SUMMARY

The present disclosure relates to an electronic apparatus. Specifically, the electronic apparatus includes a mover unit that causes at least one of a light transmitting module and a light receiving module to carry out linear movement along the optical axis of light and/or rotation about the optical axis, and the electronic apparatus carries out data transmission between the light transmitting module and the light receiving module by optical space transmission in the linear movement and the rotation.

According to an embodiment, there is provided an electronic apparatus including a light transmitting module configured to convert an electric signal into an optical signal and emit light, a light receiving module configured to receive the light emitted from the light transmitting module and convert the optical signal into an electric signal, and a mover unit configured to cause at least one of the light transmitting module and the light receiving module to carry out linear movement along the optical axis of the light emitted from the light transmitting module and/or rotation about the optical axis.

In the electronic apparatus according to the embodiment, the light emitted from the light transmitting module is received by the light receiving module. The light emitted from the light transmitting module encompasses signals arising from conversion from electric signals such as a video signal and an audio signal into optical signals. The light transmitting module and the light receiving module are caused to carry out linear movement and rotational movement by the mover unit. At this time, the light transmitting module and the light receiving module move along the optical axis of the light in the linear movement and rotate about the optical axis in the rotational movement. Therefore, data transmission can be carried out by optical space transmission (optical wireless communication) even during the operation of the linear movement and rotation of the light transmitting module and the light receiving module.

The electronic apparatus according to the embodiment includes the mover unit that causes at least one of the light transmitting module and the light receiving module to carry out linear movement along the optical, axis of light, and/or rotation, about the optical axis. Due to this feature, the occurrence of mechanical stress and noise can be suppressed even at the time of the linear movement and rotation of the light transmitting module and the light receiving module, which can enhance the endurance and the reliability. Furthermore, because data transmission by optical space transmission is possible, operational restrictions are absent in the linear movement and the rotation, which permits the operation that is impossible in a wired structure.

Additional features and advantages are described herein, and will be apparent from the following Detailed Description and the figures.

DETAILED DESCRIPTION

First Embodiment

Embodiments will be described below with reference to the drawings. The basic operation of optical space transmission according to the embodiments will be described below first. In the optical space transmission, a transmitter optical, sub-assembly (TOSA) 20 saving as one example of a light transmitting module and a receiver optical sub-assembly (ROSA) 30 serving as one example of a light receiving module are used.

Figure 1:
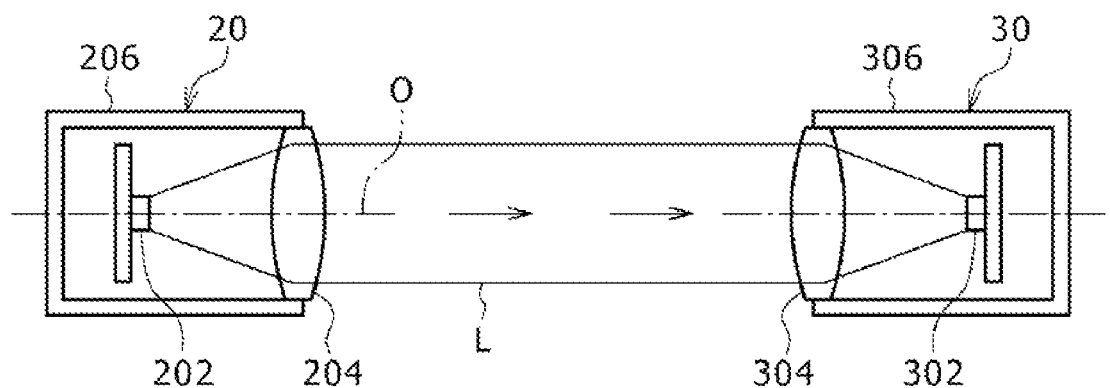
FIG. 1 is a diagram showing the configurations of a light transmitting module and a light receiving module.

FIG. 1 is a diagram showing the configurations of the TOSA 20 and the ROSA 30. The TOSA 20 is a small optical device for light transmission and includes a laser diode 202, a collimating lens 204, and a supporter 206. The supporter 206 is e.g. a cylindrical component and supports the laser diode 202 and the collimating lens 204. The laser diode 202 emits laser light L having a predetermined wavelength. The collimating lens 204 is disposed on the optical axis O of the laser diode 202 and converts the laser light L emitted from the laser diode 202 into collimated light. The diameter of the collimating lens 204 may be set large so that the beam diameter of the laser light L can be set large to thereby permit a positional error of a photodetector 302 to be described later.

The ROSA 30 is a small, optical device for light reception and includes the photodetector 302, an objective lens 304, and a supporter 306. The supporter 306 is e.g. a cylindrical component and supports the photodetector 302 and the objective lens 304. The objective lens 304 receives the laser light L converted into collimated light by the collimating lens 204 and condenses the laser light L on the photodetector 302. Setting the diameter of the objective lens 304 larger than the beam diameter of the laser light L can set the coupling efficiency to 100%. The photodetector 302 is disposed on the optical axis O of the laser diode 202 and receives the laser light L condensed by the objective lens 304 so as to convert an optical signal into an electric, signal.

(1) Linear Movement

Figure 2:
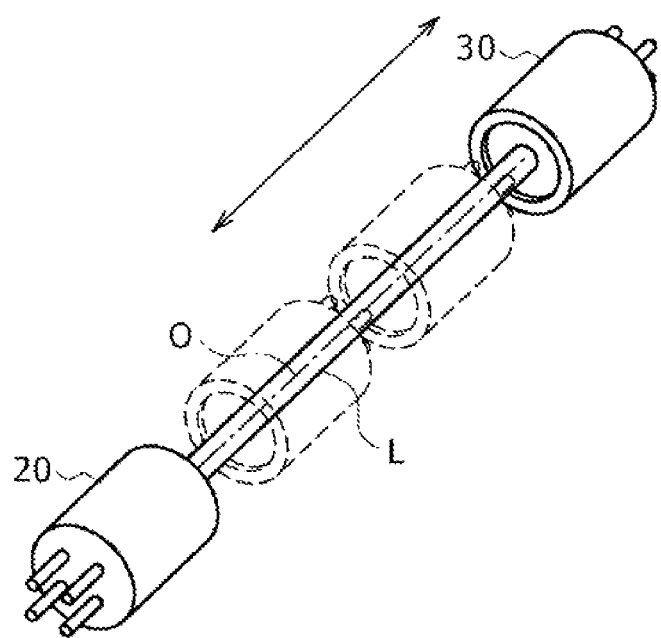
FIG. 2 is a diagram showing the (first) basic operation of optical space transmission.

FIG. 2 is a diagram showing the operation of optical space transmission when the ROSA 30 is linearly moved relative to the TOSA 20. The ROSA 30 is disposed on the optical axis O of the laser light L emitted from the TOSA 20 and linearly moves along the optical axis O to become closer to or remoter from the TOSA 20. In the optical space transmission, the coupling efficiency is independent of the distance between the TOSA 20 and the ROSA 30 because the laser light L is converted into collimated light in the TOSA 20 and the laser light L is condensed in the ROSA 30. This allows the ROSA 30 to receive the laser light L with slight loss (0%, in principle). Therefore, data transmission can be carried out accurately and stably even when the linear distance between the TOSA 20 and the ROSA 30 changes.

(2) Rotational Movement

Figure 3:
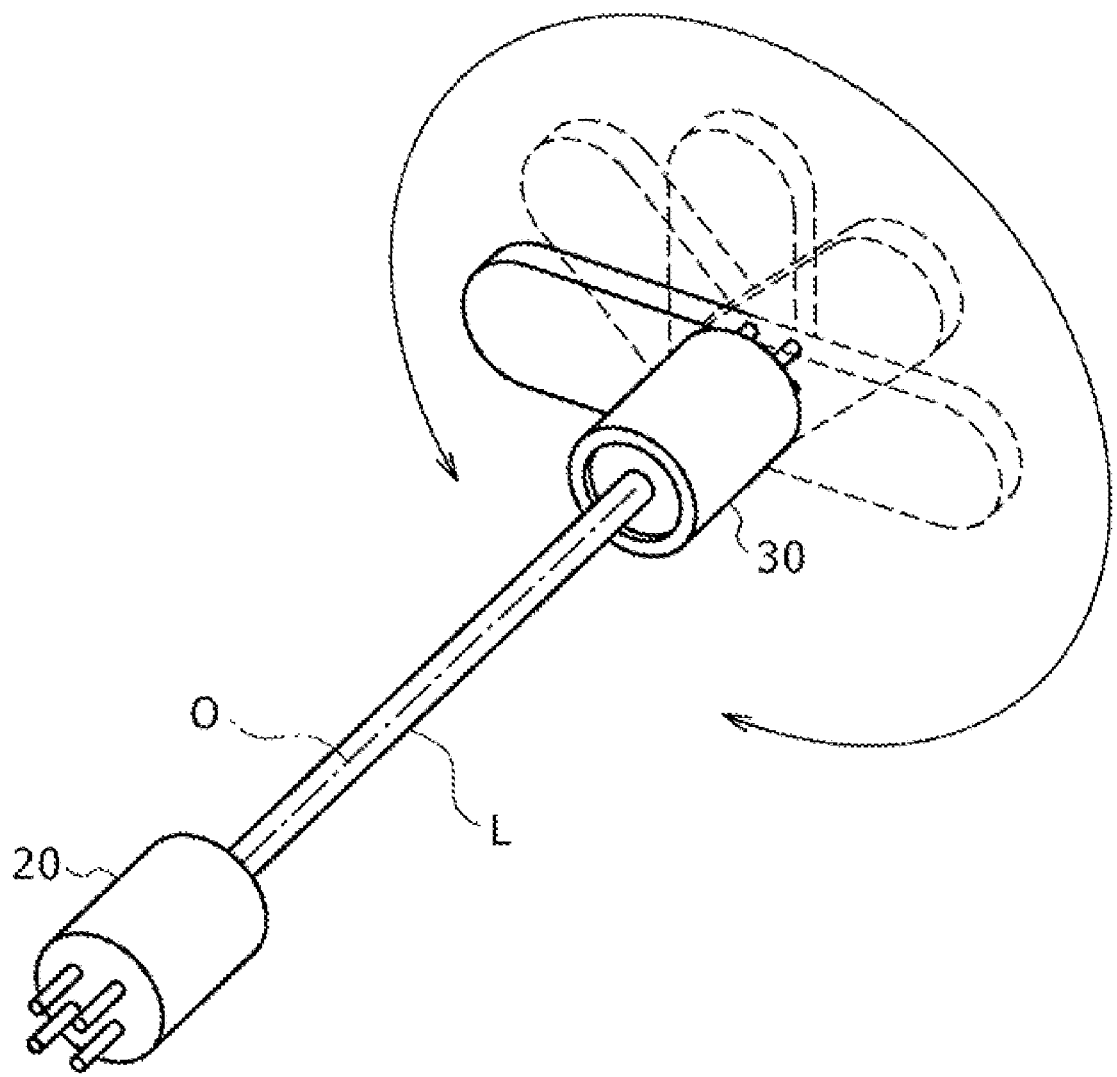
FIG. 3 is a diagram showing the (second) basic operation of optical space transmission.

FIG. 3 is a diagram showing the operation of optical space transmission when the ROSA 30 is rotationally moved relative to the TOSA 20. The ROSA 30 is disposed on the optical axis O of the laser light L emitted from the TOSA 20 and rotates about the optical axis O of the TOSA 20. Because the TOSA 20 and the ROSA 30 are aligned on the optical axis O (straight line), data transmission can be carried out accurately and stably even when the TOSA 20 and the ROSA 30 relatively rotate in the right or the left or rotate infinitely about the optical axis O.

(3) Bending Operation

Figure 4:
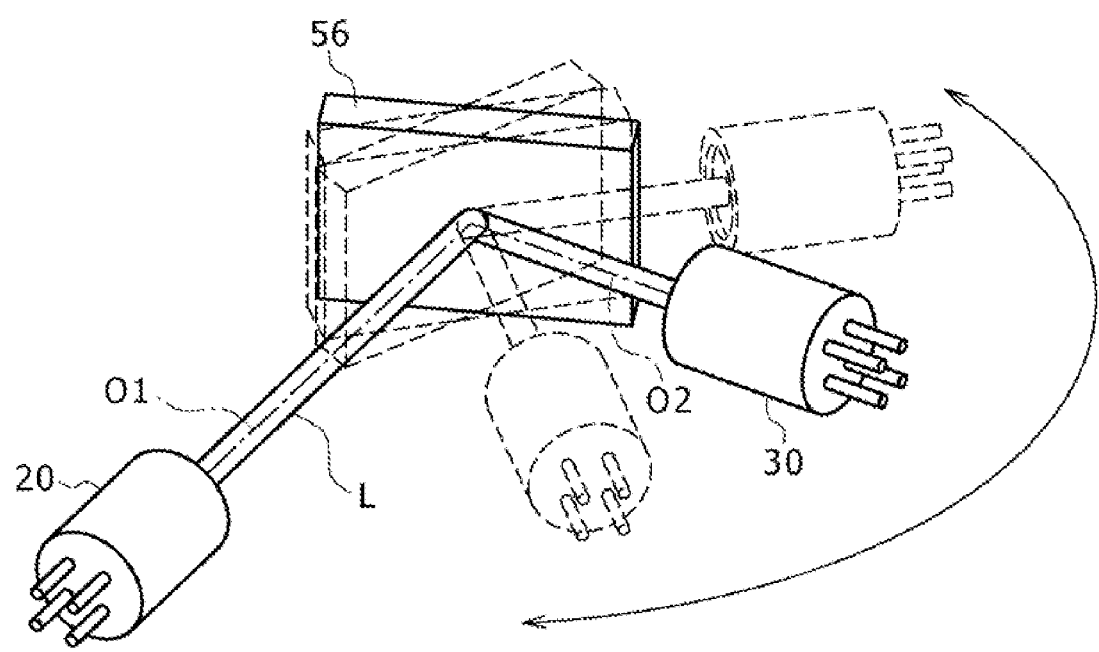
FIG. 4 is a diagram showing the (third) basic operation of optical space transmission.

FIG. 4 is a diagram showing the operation of optical space transmission when the laser light L is bent by a mirror 56 and thereby the travelling direction thereof is changed.

The mirror 56 is disposed between the TOSA 20 and the ROSA 30. The mirror 56 is one example of a reflector and disposed on the optical axis O1 of the TOSA 20. The ROSA 30 is disposed on the optical axis O2 of the laser light L bent by the mirror 56. This allows the ROSA 30 to receive the laser light L bent by the mirror 56 after being emitted from the TOSA 20. Even when the mirror 56 is inclined at a predetermined angle, disposing the mirror 56 on the optical axis O1 and disposing the ROSA 30 on the optical axis O2 make it possible to receive the laser light L bent by the mirror 56 accurately and stably.

(Configuration of Cellular Rhone)

Figure 5:
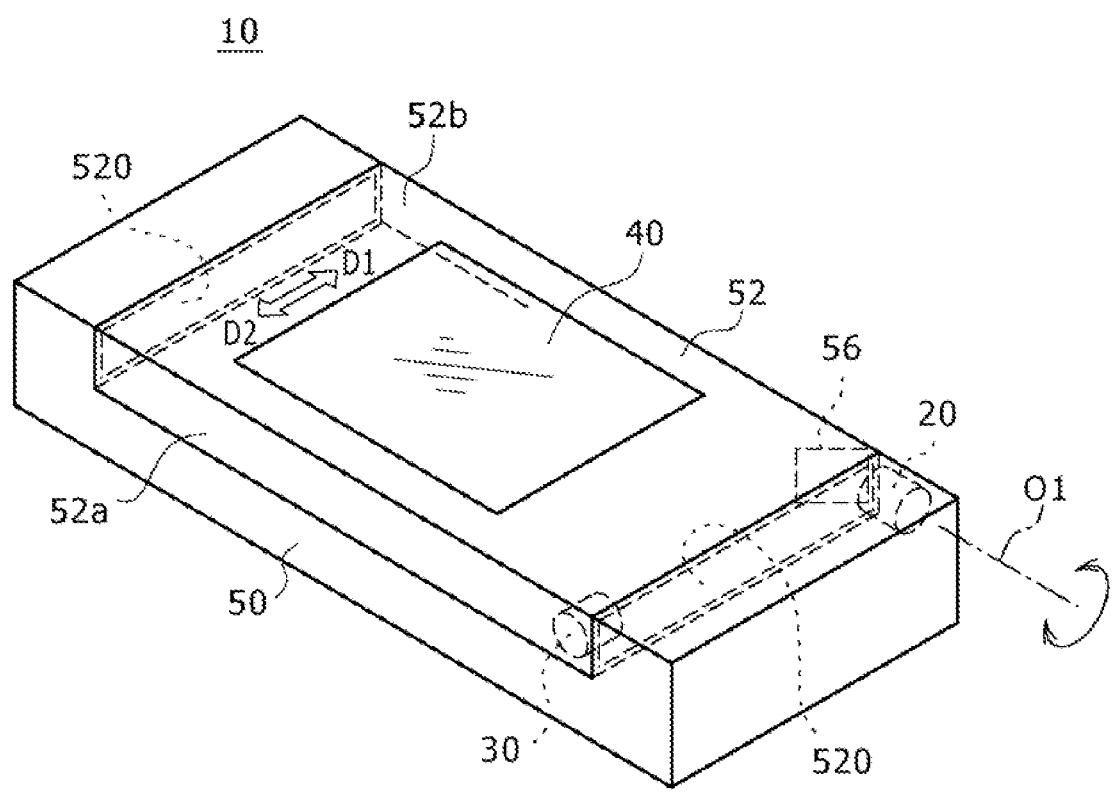
FIG. 5 is a perspective view showing the configuration of a cellular phone according to one embodiment.

A description will be made below about a cellular phone 10 to which the operation of optical space transmission as a combination, of the above-described basic operations (1) to (3) is applied. FIG. 5 is a perspective view showing the configuration of the cellular phone 10 according to one embodiment. The cellular phone 10 includes a first case 50, a second case 52, a slider unit (mover unit, see FIG. 7) 58, a hinge unit (mover unit, see FIG. 8) 54, the TOSA 20, the ROSA 30, the minor 56, and a display unit 40.

The first case 50 and the second case 52 are rotatably coupled with each other via the hinge unit 54 and are slidably coupled with each other via the slider unit 58. The first case 50 has a rectangular parallelepiped shape that is a rectangle in plan view. In upper face part thereof, a concave part (see FIG. 10A) that arises from cutout of a partial portion having an outer shape slightly smaller than that of the first case 50 is formed. On the top surface of the concave part of the first case 50, an operation component 92 (see FIG. 10A) exposed when the second case 52 is slid is provided. The operation component. 92 includes e.g. plural alphanumeric buttons and a power button.

The second case 52 has the rectangular parallelepiped shape corresponding to the shape of the concave part, and is rotatably and slidably fitted in the concave part of the first case 50. In upper face part of the second case 52, the display unit 40 formed of a liquid crystal display or an organic electro luminescence (EL) display is provided. An opening 520 (see FIG. 10A) for sliding is formed in side face part along the shorter side direction of the second case 52.

Figure 6:
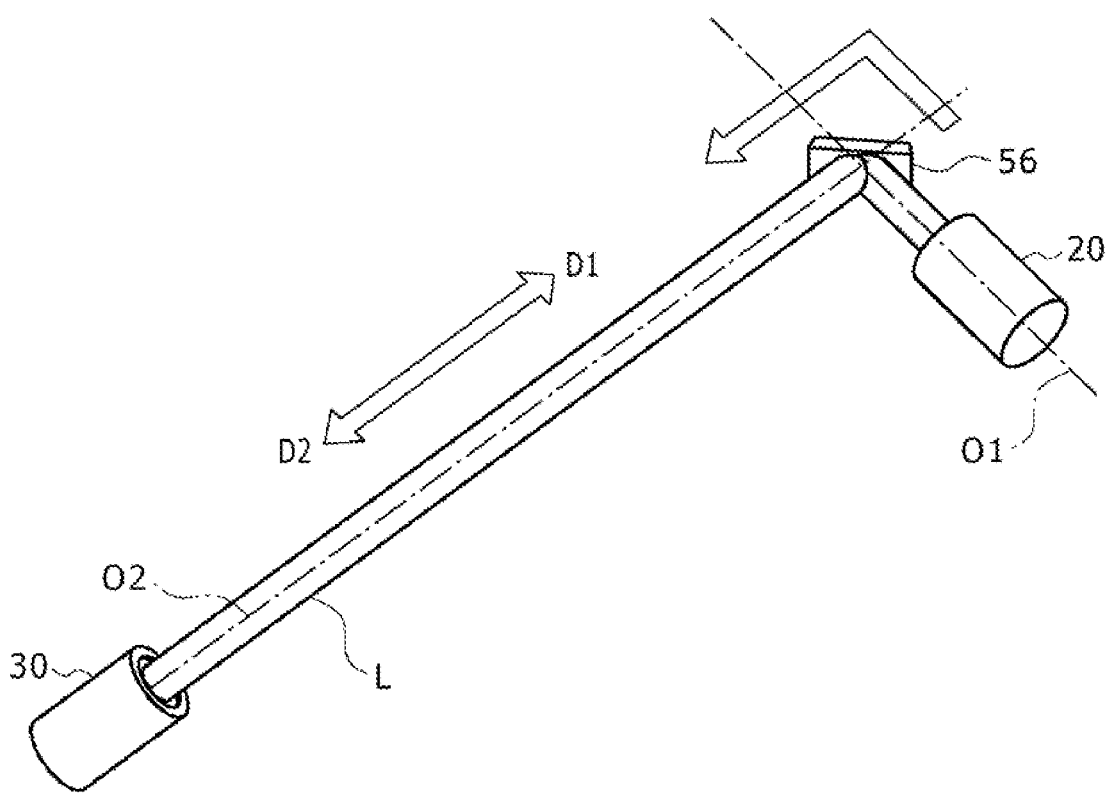
FIG. 6 is a diagram showing the configuration of optical space transmission.

FIG. 6 is a diagram showing the configuration of the TOSA 20, the mirror 56, and the ROSA 30 at the time of optical space transmission. As shown in FIGS. 5 and 6, the TOSA 20 is attached and fixed to an end (corner) of the first case 50 in the longer side direction of the first case 50 in such a way that the output port of the laser light L is oriented toward the second case 52.

The mirror 56 is mounted inside the second case 52 and at the side end that is on the optical axis O1 of the laser light L emitted from the TOSA 20 and faces the TOSA 20. This mirror 56 is so disposed that the angle formed by the reflecting surface of the mirror 56 and the optical axis O1, and the angle formed by the reflecting surface of the mirror 56 and the optical axis O2 are each 45°. The laser light L emitted from the TOSA 20 is bent by the mirror 56 by substantially 90° and travels straight toward the ROSA 30.

The ROSA 30 is disposed at the side end of the second case 52 that is on the optical axis O2 of the laser light L bent by the mirror 56 and on the opposite side to the mirror 56 in the shorter side direction of the second case 52. The ROSA 30 receives the laser light L emitted from the TOSA 20 via the mirror 56 also in the state in which the second case 52 is slid along the shorter side direction of the first case 50 and is rotated about the optical axis O1.

Figure 7:
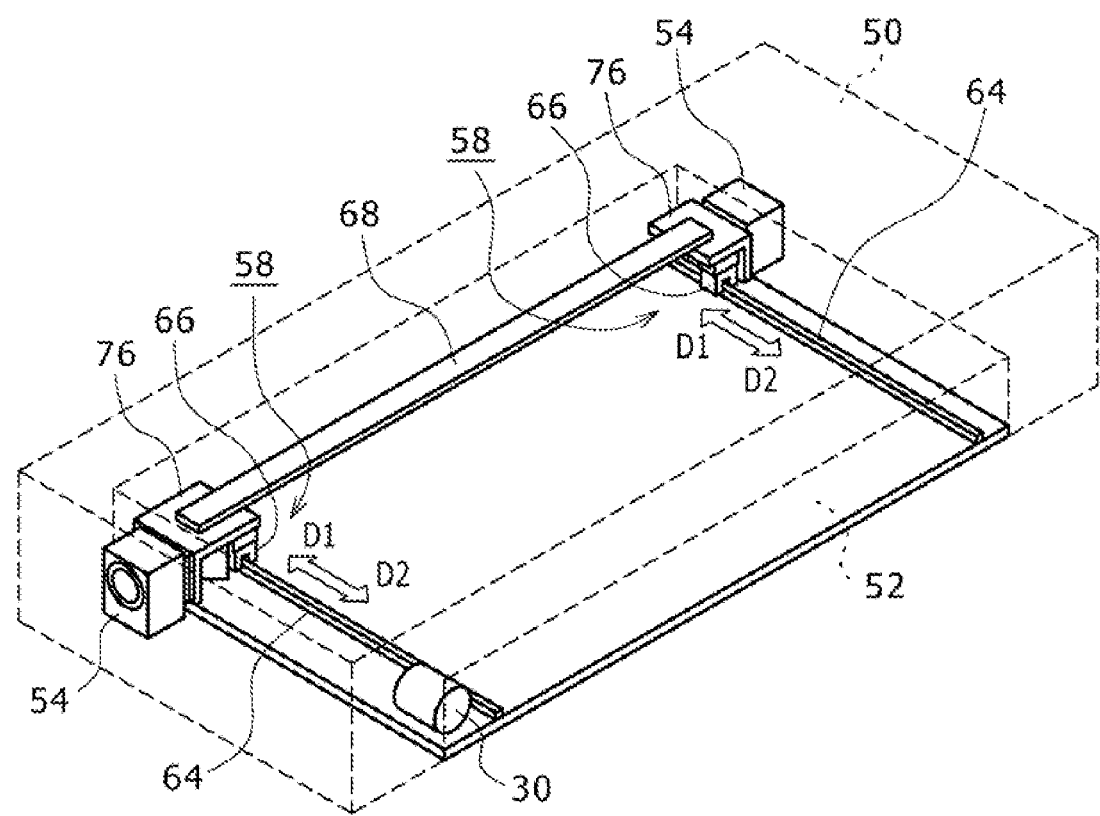
FIG. 7 is a diagram showing the structure of a slider unit.

FIG. 7 is a diagram showing one example of the structure of the slider unit 58. Specifically, FIG. 7 shows the structure of the slider unit 58 inside the cellular phone 10 when the cellular phone 10 is turned upside down. The slider unit 58 includes rails 64 and guides 66.

The rails 64 are formed on the backside of the upper surface of the second case 52 and at both the ends of the second case 52 in the longer side direction of the second case 52. The rails 64 are provided along the shorter side direction of the second case 52. Upper part of the guide 66 is attached to the hinge unit 54 via a supporter 76, and lower part of the guide 66 is slidably engaged with the rail 64. This structure allows the second case 52 to be slid relative to the first case 50 in each of arrowhead directions D1 and D2 along the rails 64. In the present example, the arrowhead directions D1 and D2 are parallel to the optical axis O2. The supporters 76 are coupled with each other by a coupler 68 extending along the longer side direction of the second case 52.

Figure 8:
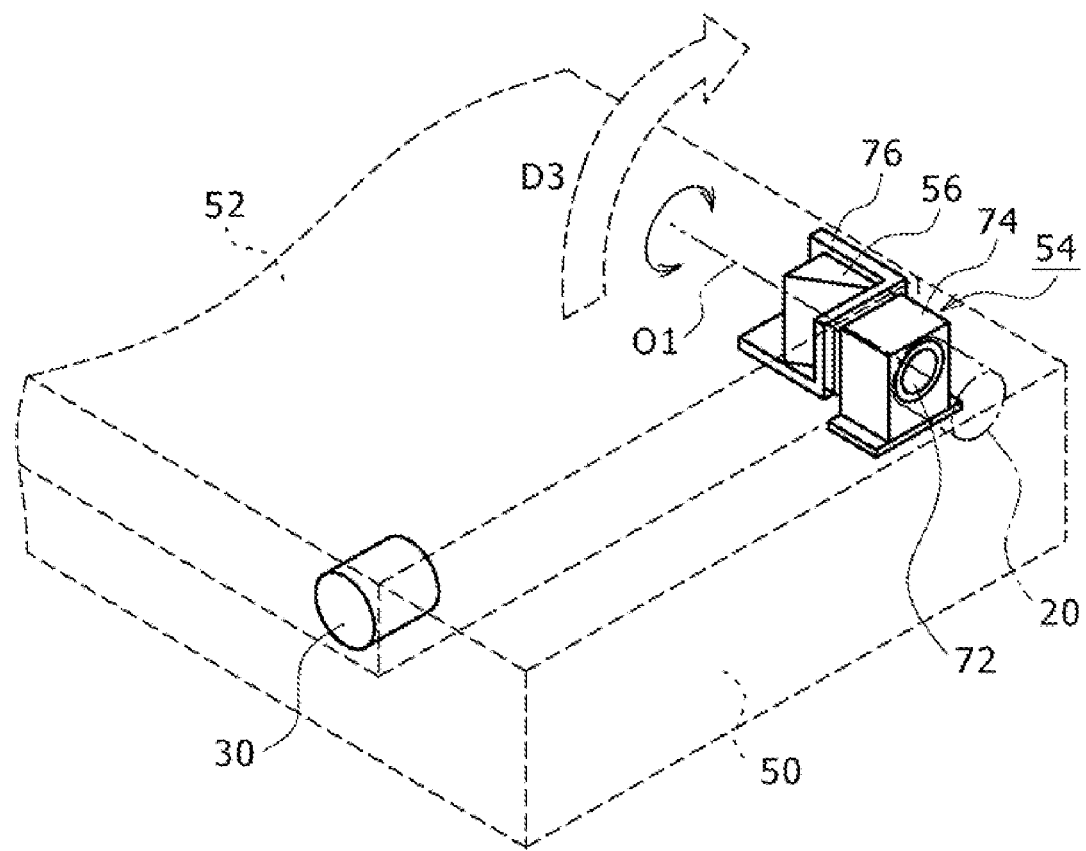
FIG. 8 is a diagram showing the structure of a hinge unit.

FIG. 8 is a diagram showing one example of the structure of the hinge unit 54. The hinge unit 54 is attached to an end (corner) of the first case 50 in the longer side direction of the first case 50 inside the first case 50 (see FIG. 7). The hinge unit 54 is composed of a bearing 74 and a shaft 72 that is rotatably supported by this bearing 74. The TOSA 20 (dot-dash line) is attached and fixed to the external surface of the hearing 74 on the opposite side to the second case 52. The shaft 72 has a cylindrical shape and is so attached to the bearing 74 that the shaft center thereof is positioned on the optical axis O1. The mirror 56 is attached to one end of the shaft 72 via the supporter 76. Thus, the mirror 56 rotates about the optical axis O1 in linkage with the rotation of the shaft 72. In the present example, the cellular phone 10 is so configured that the second case 52 can rotate by the hinge unit 54 when a side part 52a or 52b of the second case 52 along the longer side direction thereof is positioned at (slid to) the vicinity of the hinge unit 54 (see FIGS. 5 and 11A and 11B).

The supporter 76 and the mirror 56 are disposed at the side end inside the second case 52, opposed to the TOSA 20 (hinge unit 54), and are so held as to be sandwiched between upper face pan and lower face pan of the second case 52. Due to this structure, when the second case 52 is so rotated in arrowhead direction D3 that the hinge unit 54 serves as the support point, the supporter 76 and the mirror 56 integrally rotate in the arrowhead direction D3 in linkage with this rotation. Also at the other side end of the second case 52 (see FIG. 7), the hinge unit 54 having the same structure as that of the above-described hinge unit 54 is provided.

Figure 9:
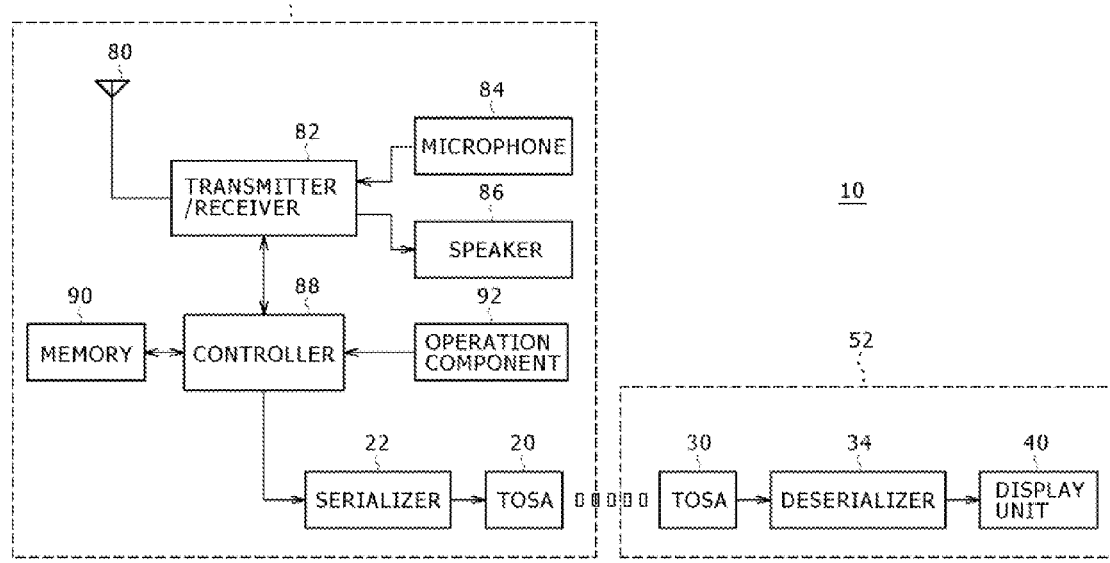
FIG. 9 is a diagram showing the block configuration of the cellular phone.

FIG. 9 is a diagram showing one example of the block configuration of the cellular phone 10.

The cellular phone 10 includes an antenna 80 and a transmitter/receiver 82 for bidirectional communication with a base station, a speaker 86 for outputting audio such as a ring tone and received speech, and a microphone 84 for collecting transmission speech and so on. Furthermore, the cellular phone 10 includes a controller 88 having a CPU for controlling the whole of the cellular phone 10, a memory 90 formed of a ROM (Read Only Memory) and a RAM (Random Access Memory), and the operation component 92, with which a user carries out input operation. These units are provided inside the first case 50.

The cellular phone 10 includes a serializer 22 and the TOSA 20 provided in the first case 50, and the ROSA 30, a deserializer 34, and the display unit 40 provided in the second case 52. The serializer 22 serializes e.g. an image signal and a video signal supplied via a large number of signal lines connected to the controller 88 and supplies the resulting signals to the TOSA 20. The TOSA 20 converts the serialized image signal and so on supplied from the serializer 22 from the electric signal into an optical signal, and transmits the optical signal to the ROSA 30 in the second case 52.

The ROSA 30 receives the optical signal supplied from the TOSA 20 and converts the optical signal into an electric signal. The ROSA 30 supplies the electric, signal to the deserializer 34. The deserializer 34 parallelizes the serialized electric signal to thereby convert this signal into the original image signal, and supplies it to the display unit 40. The display unit 40 displays an image based on the image signal and so on supplied from the deserializer 34 on the screen. In this manner, an image signal, a video signal, and an audio signal can be transmitted between the first case 50 and the second case 52 by optical space transmission (optical wireless communication).

Although the display unit 40 is provided only in the second case 52 in the present example, another display unit may be provided in the first case 50. Furthermore, an imaging unit formed of a complementary metal oxide semiconductor (CMOS) and so on may be provided, and a tuner unit may be provided so that the display unit 40 can display a moving image.

(Operation of Cellular Phone)

One example of the operation of the cellular phone 10 in optical space transmission will be described below. The following description is based on the assumption that an optical signal is transmitted from the TOSA 20 to the ROSA 30 during the operation of the cellular phone 10, FIGS. 10A to 20B are diagrams showing the operation of the cellular phone 10 at the time of the optical space transmission. Each diagram of FIGS. 10A, 11A, 12A, 13A, 14A, 15A, 16A, 17A, 18A, 19A and 20A shows the operation of the whole of the cellular phone 10, and each diagram of FIGS. 10B, 11B, 12B, 13B, 14B, 15B, 16B, 17B, 18B, 19B and 20B shows only the operation of the mirror 56 and the ROSA 30.

Figure 10A:
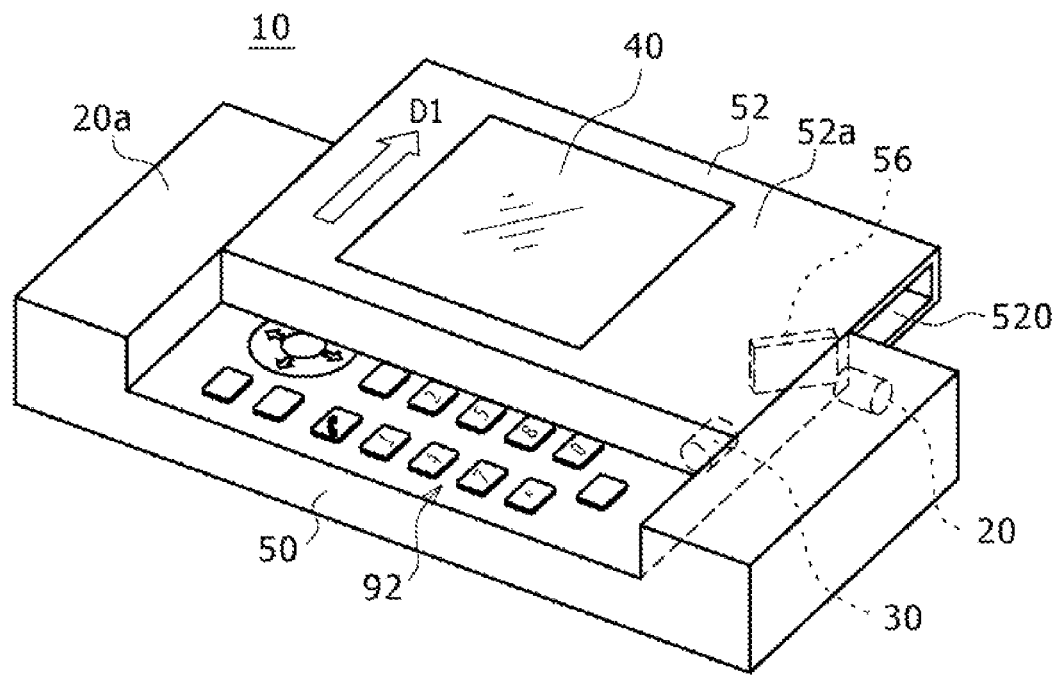
FIGS. 10A and 10B are diagrams showing the (first) operation of the cellular phone in optical space transmission.
Figure 10B:
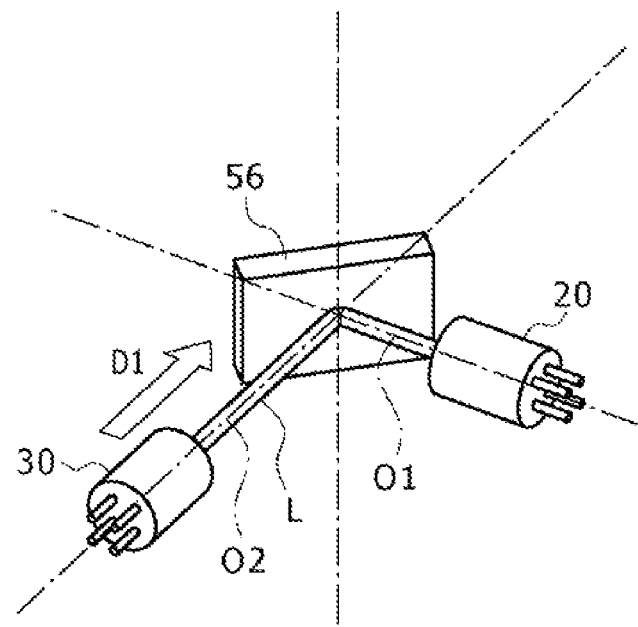

As shown in FIGS. 10A and 10B, when the second case 52 is slid along the shorter side direction of the first, case 50 (arrowhead direction D1) by the operation of a user, the ROSA 30 moves in the arrowhead direction D1 along the optical axis O2 in linkage with this sliding. At this time, the mirror 56 is not slid but at rest because it is fixed to the first case 50 via the hinge unit 54.

Figure 11A:
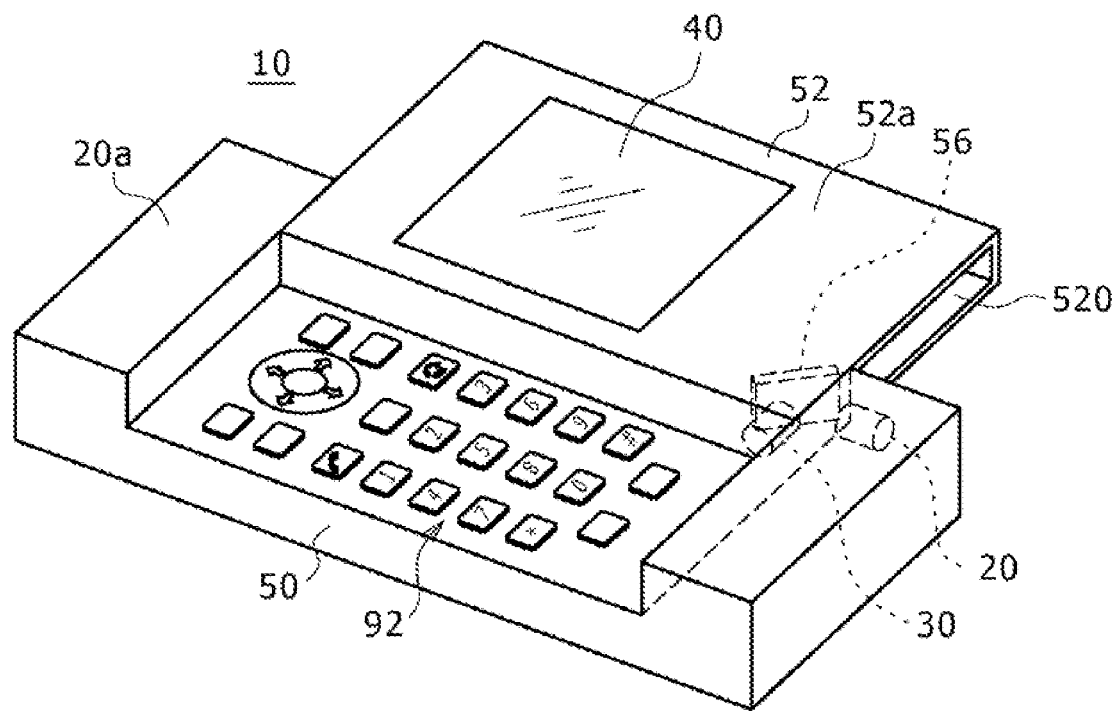
FIGS. 11A and 11B are diagrams showing the (second) operation of the cellular phone in optical space transmission.
Figure 11B:
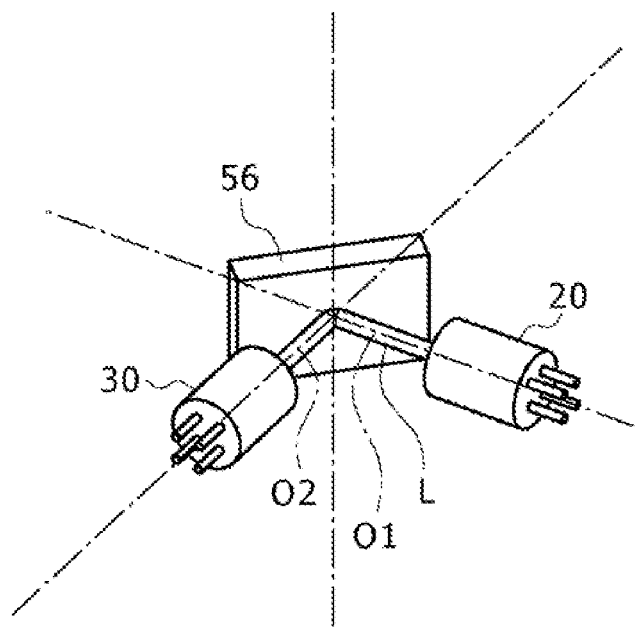

As shown in FIGS. 11A and 11B, when the second case 52 is slid to a side face part 20a of the first, case 50 and the ROSA 30 is brought close to the mirror 56, the sliding of the second case 52 is stopped by stoppers (not shown) provided on the rails 64 in the second case 52. The second case 52 protrudes outward from the side face part 20a of the first case 50.

Figure 12A:
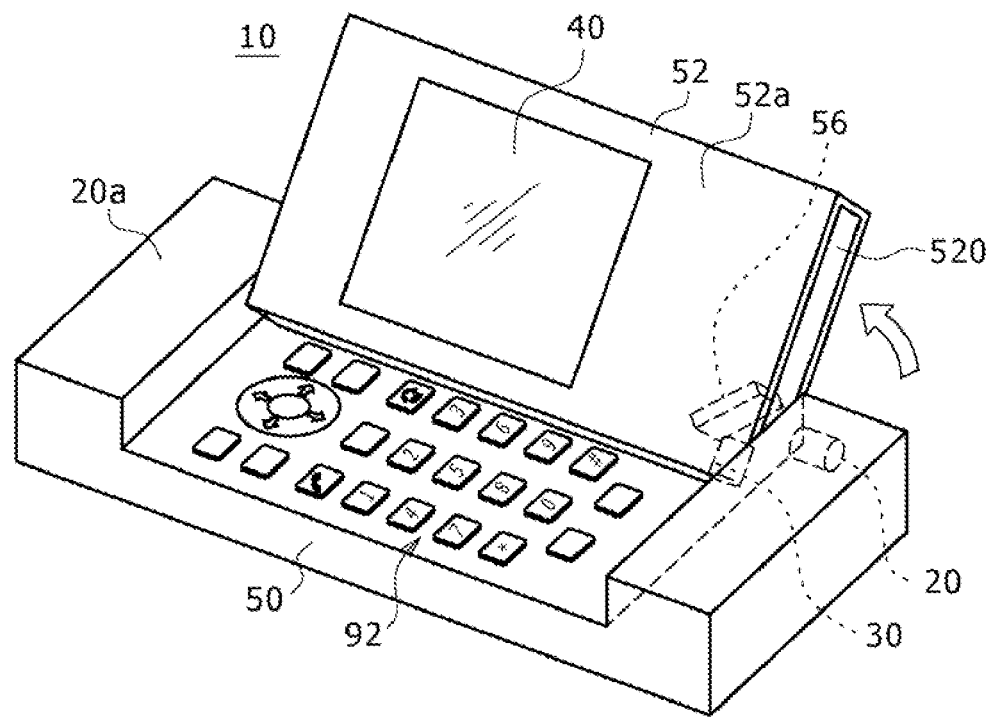
FIGS. 12A and 12B are diagrams showing the (third) operation of the cellular phone in optical space transmission.
Figure 12B:
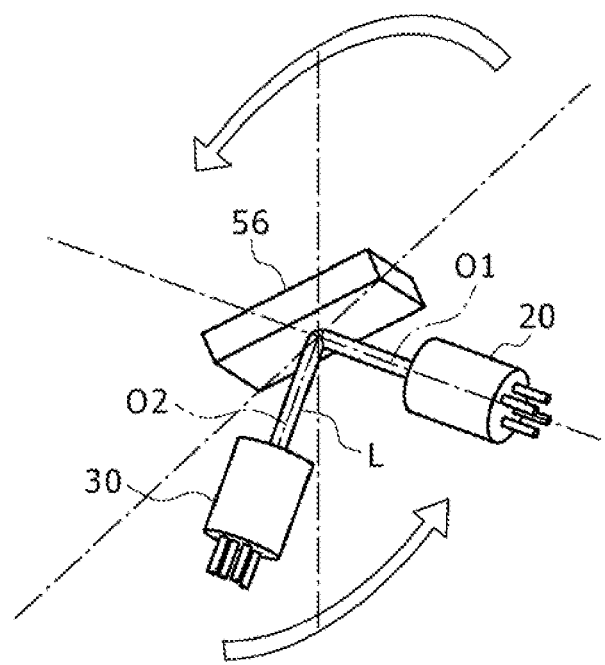
Figure 13A:
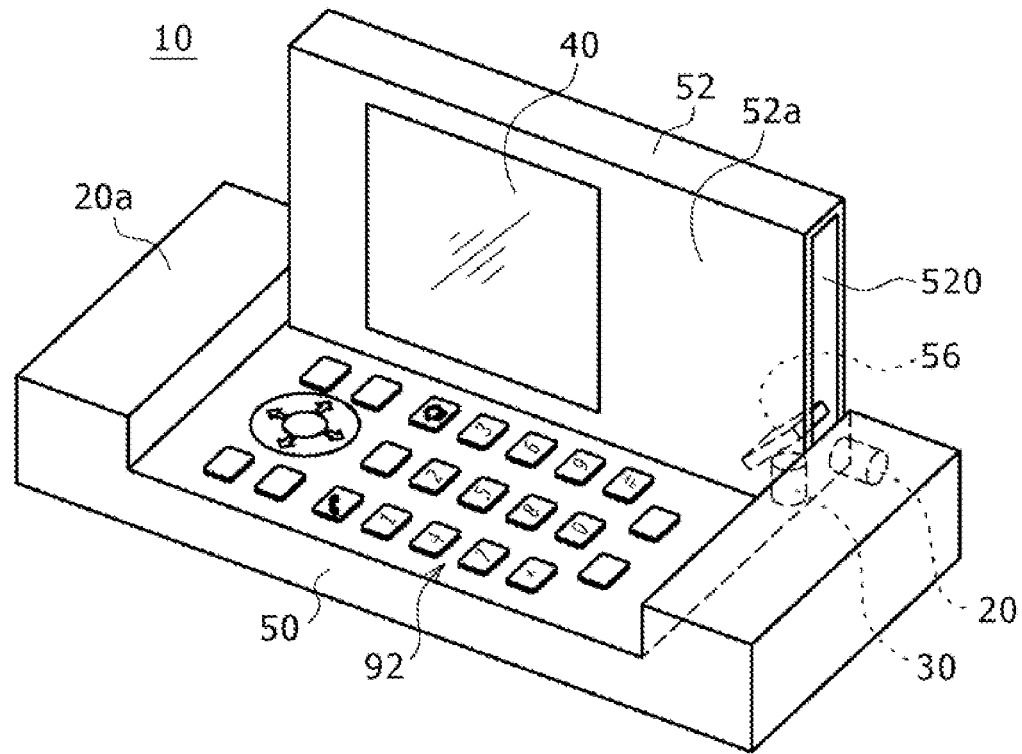
FIGS. 13A and 13B are diagrams showing the (fourth) operation of the cellular phone in optical space transmission.
Figure 13B:
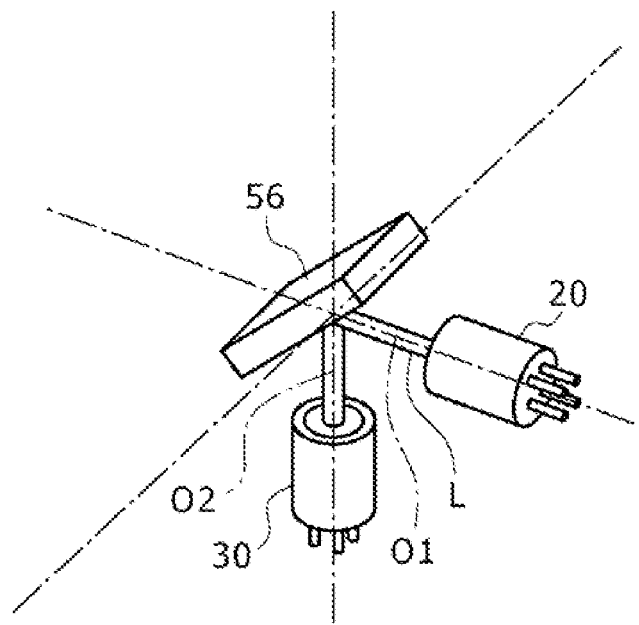
Figure 14A:
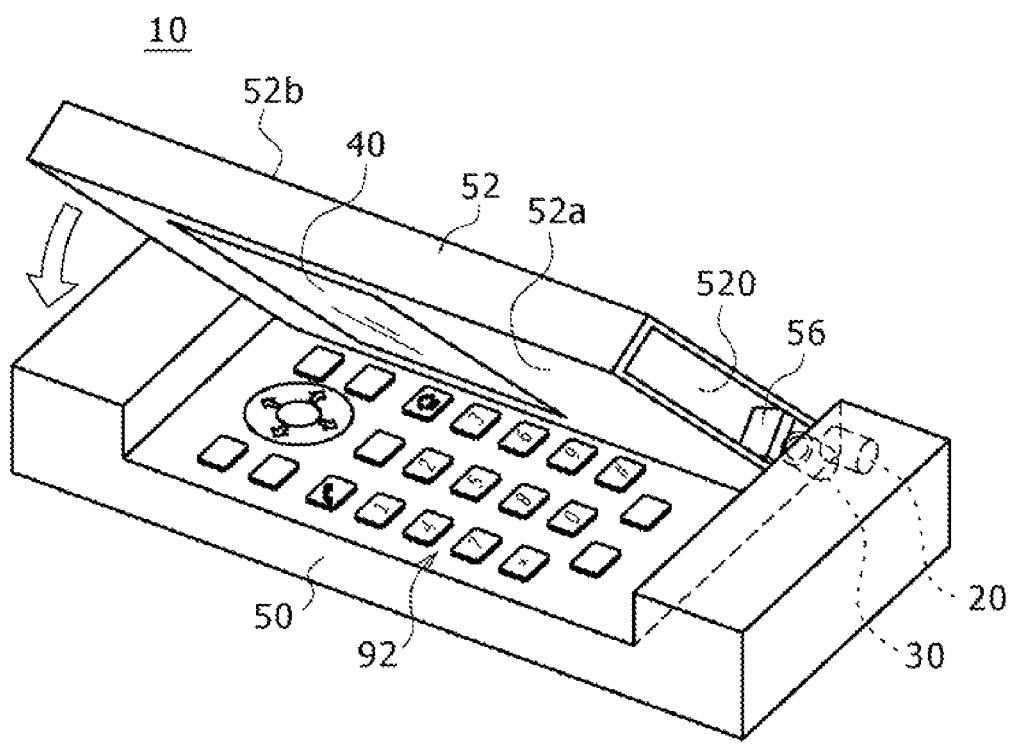
FIGS. 14A and 14B are diagrams showing the (fifth) operation of the cellular phone in optical space transmission.
Figure 14B:
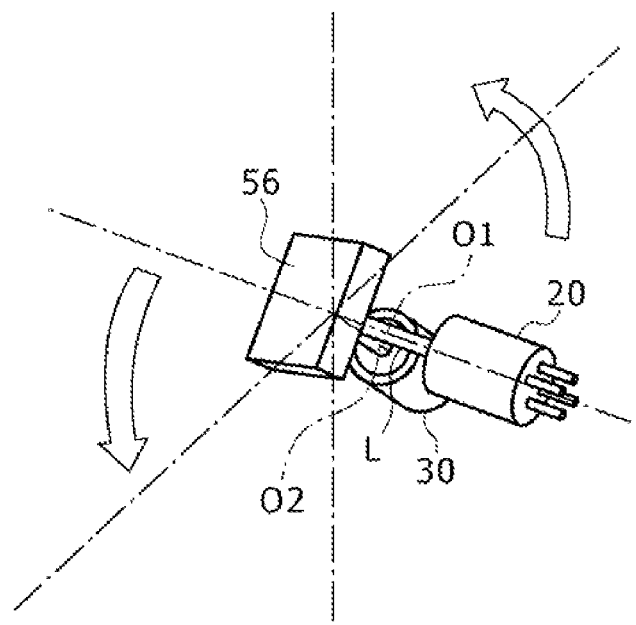
Figure 15A:
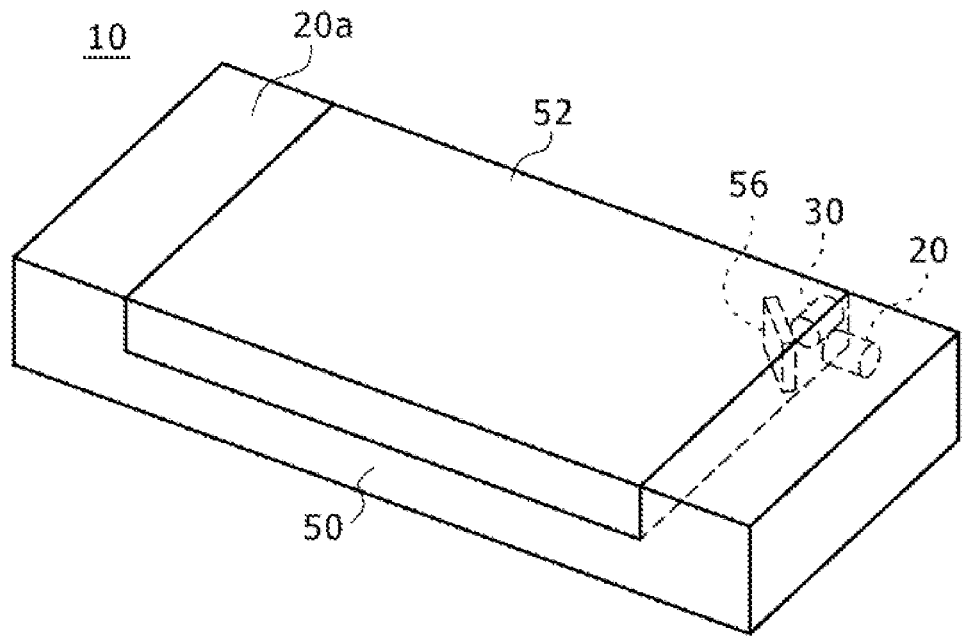
FIGS. 15A and 15B are diagrams showing the (sixth) operation of the cellular phone in optical space transmission.
Figure 15B:
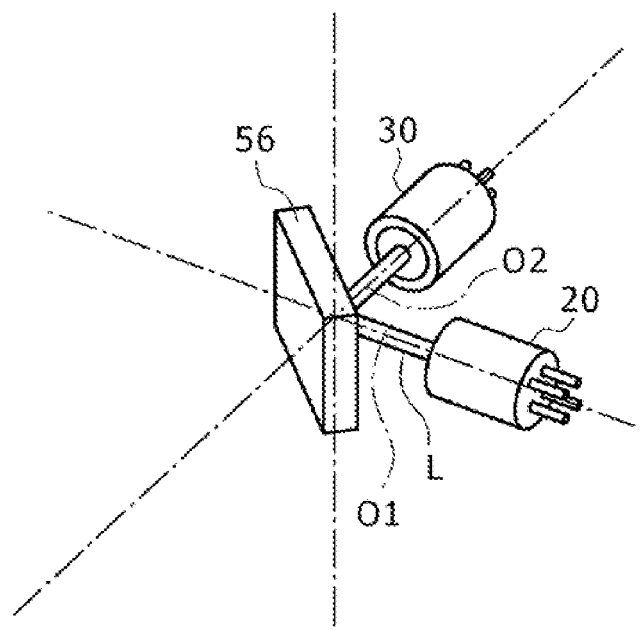

Subsequently, as shown in FIGS. 12A and 12B, the second case 52 is rotated about the optical axis O1 by the hinge unit 54. Specifically, the second case 52 is so rotated counterclockwise that the side part 52a of the second case 52 serves as the support point. In linkage with the rotation of the second case 52, the mirror 56 and the ROSA 30 integrally rotate about the optical axis O1. Therefore, the ROSA 30 is so rotated as to be positioned on the optical axis O2. Subsequently, as shown in FIGS. 13A to 15B, the second case 52 is continuously rotated anticlockwise by 180° by the hinge unit 54, so that the second case 52 is turned upside down.

Figure 16A:
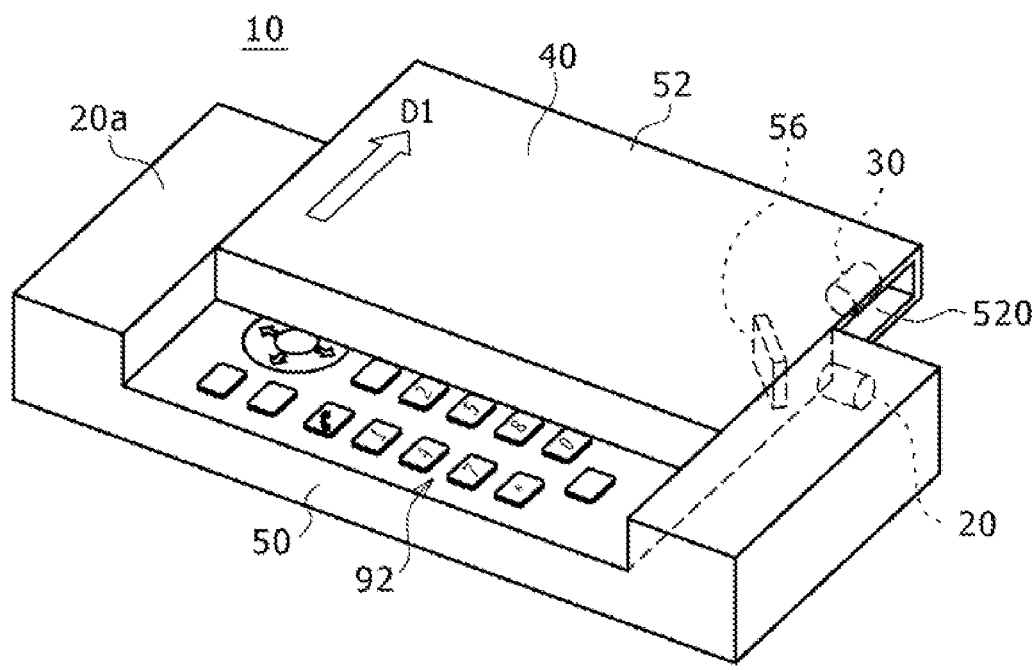
FIGS. 16A and 16B are diagrams showing the (seventh) operation of the cellular phone in optical space transmission.
Figure 16B:
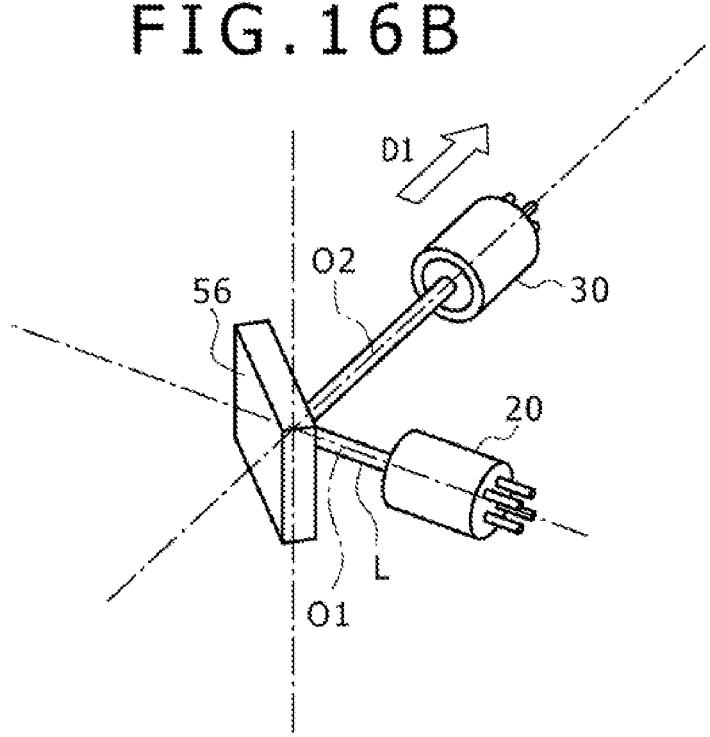

Subsequently, as shown in FIGS. 16A and 16B, the second case 52 is slid along the shorter side direction of the first case 50 (arrowhead direction D1). The ROSA 30 moves in the arrowhead direction D1 along the optical axis O2 in linkage with the sliding of the second case 52. That is, the ROSA 30 moves in such a direction as to become remoter from the mirror 56. The mirror 56 is not slid but at rest because it is fixed to the first case 50 via the hinge unit 54.

Figure 17A:
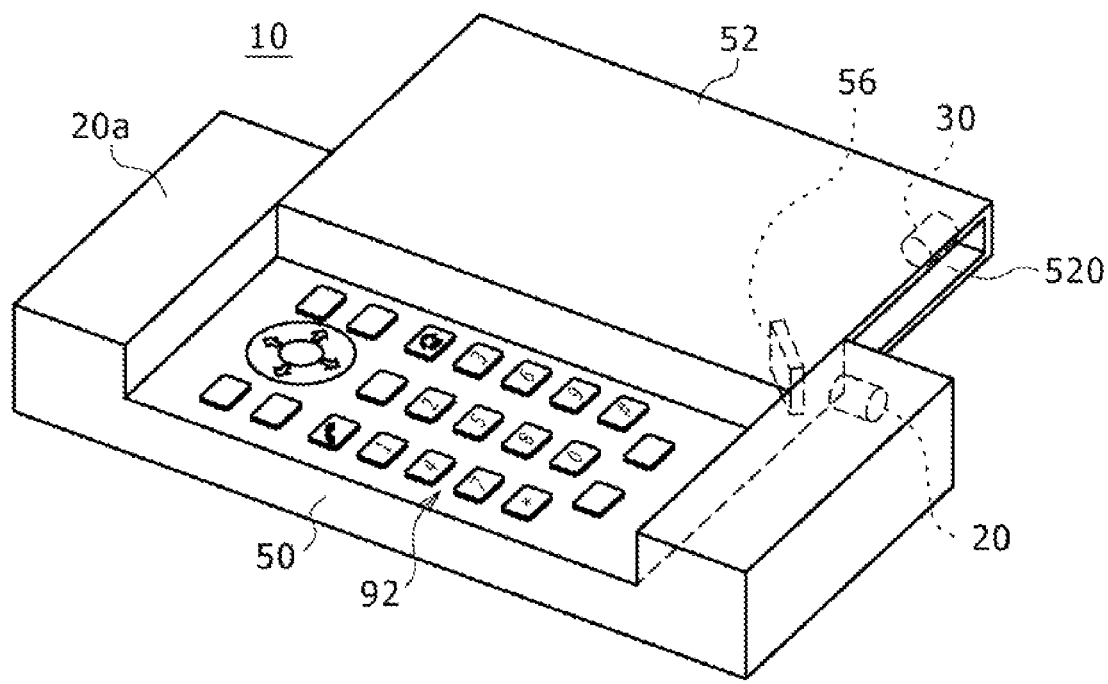
FIGS. 17A and 17B are diagrams showing the (eighth) operation of the cellular phone in optical space transmission.
Figure 17B:
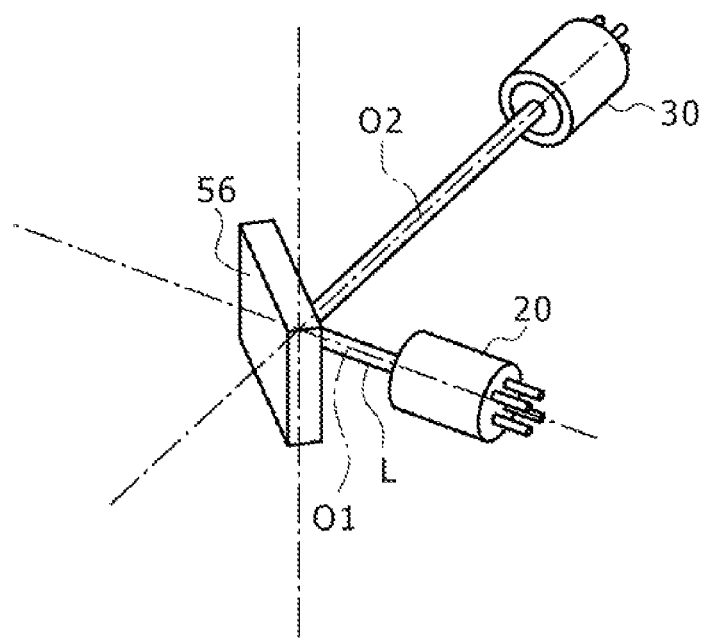

As shown in FIGS. 17A and 17B, when the second case 52 is slid to the side face part 20a of the first case 50 and the ROSA 30 is moved to a position far from the mirror 56, the sliding of the second case 52 is stopped by the stoppers (not shown) provided on the rails 64 in the second case 52. The second case 52 protrudes outward from the side face part 20a of the first case 50.

Figure 18A:
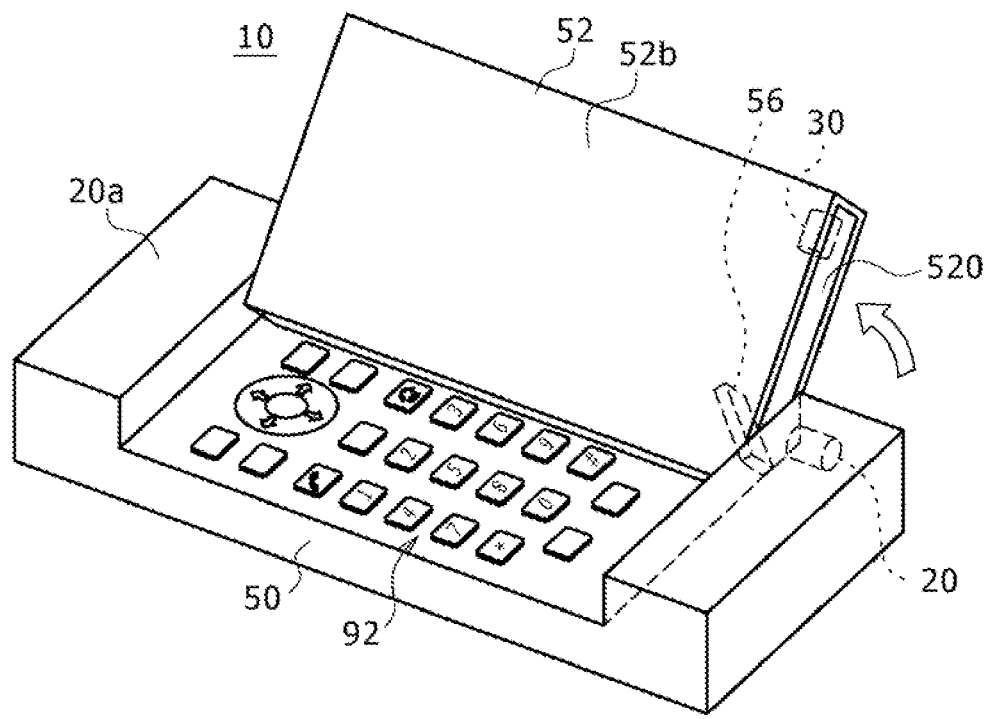
FIGS. 18A and 18B are diagrams showing the (ninth) operation of the cellular phone in optical space transmission.
Figure 18B:
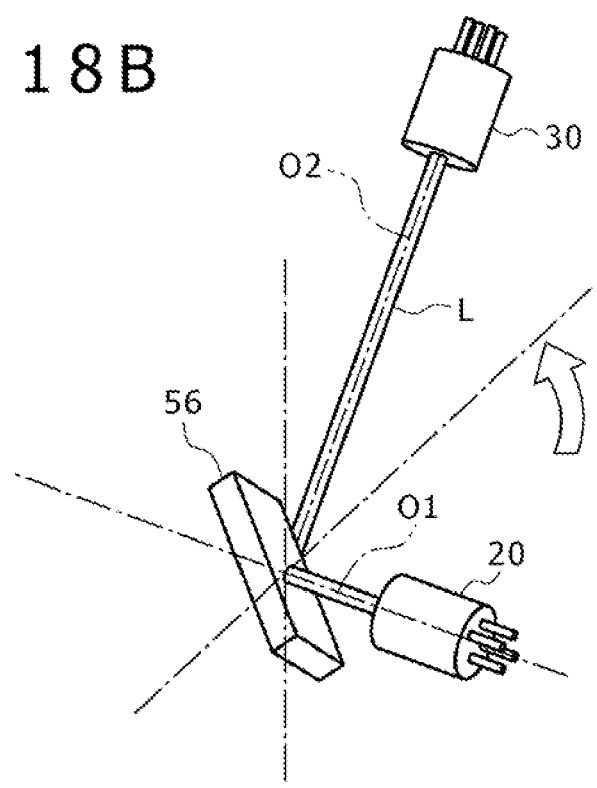
Figure 19A:
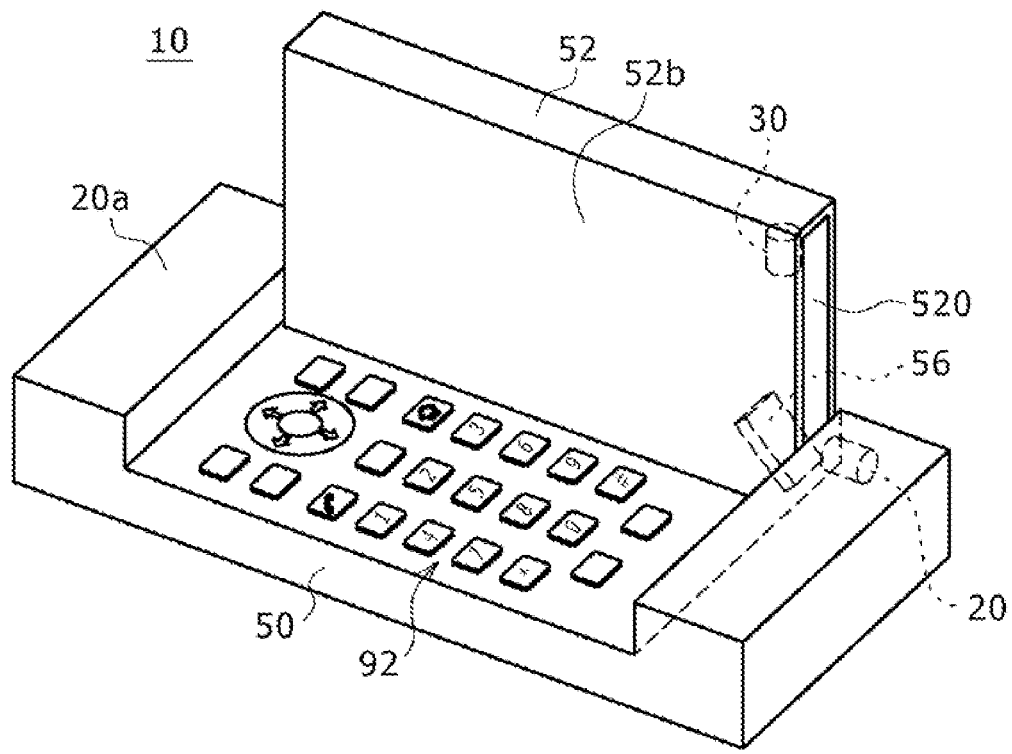
FIGS. 19A and 19B are diagrams showing the (tenth) operation of the cellular phone in optical space transmission.
Figure 19B:
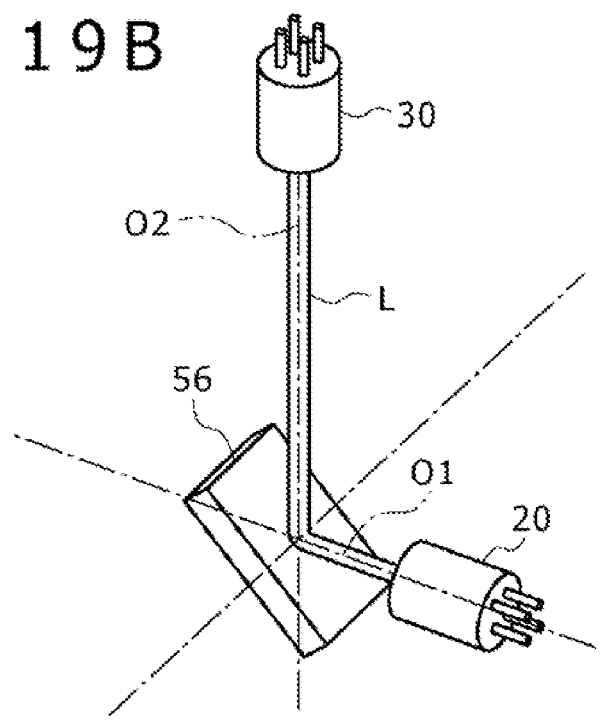
Figure 20A:
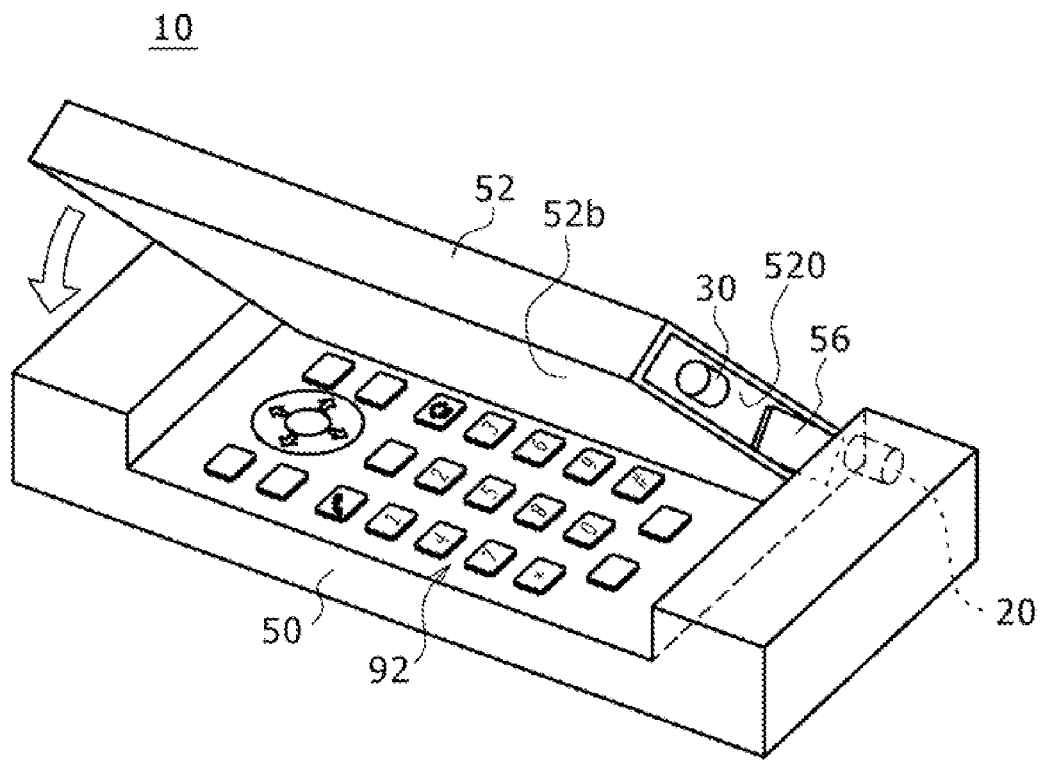
FIGS. 20A and 20B are diagrams showing the (eleventh) operation of the cellular phone in optical space transmission.
Figure 20B:
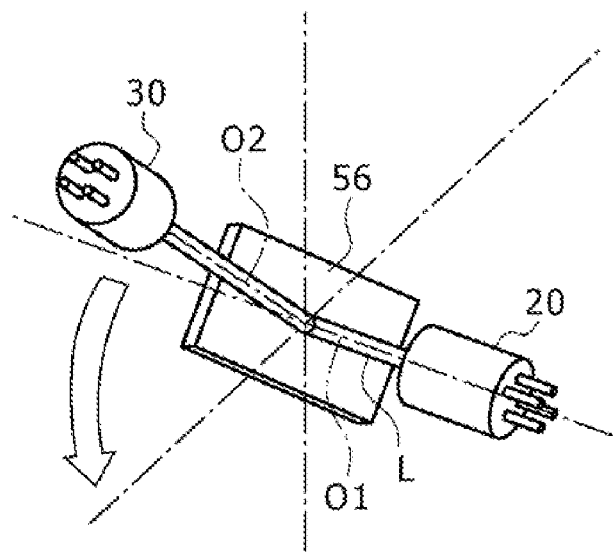

Subsequently, as shown in FIGS. 18A and 18B, the second case 52 is rotated about the optical axis O1 by the hinge unit 54. Specifically, the second case 52 is so rotated anticlockwise that the side part 52b of the second case 52 serves as the support point. In linkage with the rotation of the second case 52, the mirror 56 and the ROSA 30 integrally rotate about the optical axis O1. Therefore, the ROSA 30 is so rotated as to be positioned on the optical axis O2.

Subsequently, as shown in FIGS. 19A to 20B, the second case 52 is continuously rotated anticlockwise by 180° by the hinge unit 54, so that the second case 52 is turned upside down. Thus, the second case 52 is rotated by 360° totally to revert to its original state through the inversion of the upper and lower faces thereof, which results in the state in which the display unit 40 is disposed at the upper surface of the second case 52 (see FIG. 5).

As described above, in the present embodiment, the state is kept in which the mirror 56 is disposed on the optical axis O1 of the TOSA 20 and the ROSA 30 is disposed on the optical axis O2 of the laser light L bent by the mirror 56 even during the operation of sliding and rotation of the second case 52. Thus, data transmission by optical space transmission can be carried out between the TOSA 20 and the ROSA 30 even during the operation of the second case 52.

Therefore, even at the time of the operation of the linear movement and rotation of the first and second cases 50 and 52, the occurrence of mechanical stress and electric signal noise due to the sliding and bending of a cable or the like can be suppressed differently from the related art. This can enhance the endurance and reliability of the cellular phone 10.

Furthermore, because data via plural signal lines are serialized by the serializer 22 so that the data can be transmitted by one channel, space saving of the transmission path can be achieved. Although data are thus serialized, the transmission speed is not lowered compared with the wire connection in the related art because data transmission can be carried out by optical space transmission.

Moreover, using the mirror 56 eliminates the need for the TOSA 20 and the ROSA 30 to be opposed to each other, which can provide high flexibility of the transmission path design. Although one mirror 56 is used in the above-described first embodiment, optical space transmission may be achieved by using two or more mirrors and bending the laser light L at two or more positions.

Second Embodiment

Another embodiment is described below with reference to a drawing. The same components as those for the basic operation of optical space transmission and so on described for the first embodiment are given the same numerals and symbols, and the detailed description thereof is omitted.

Figure 21:
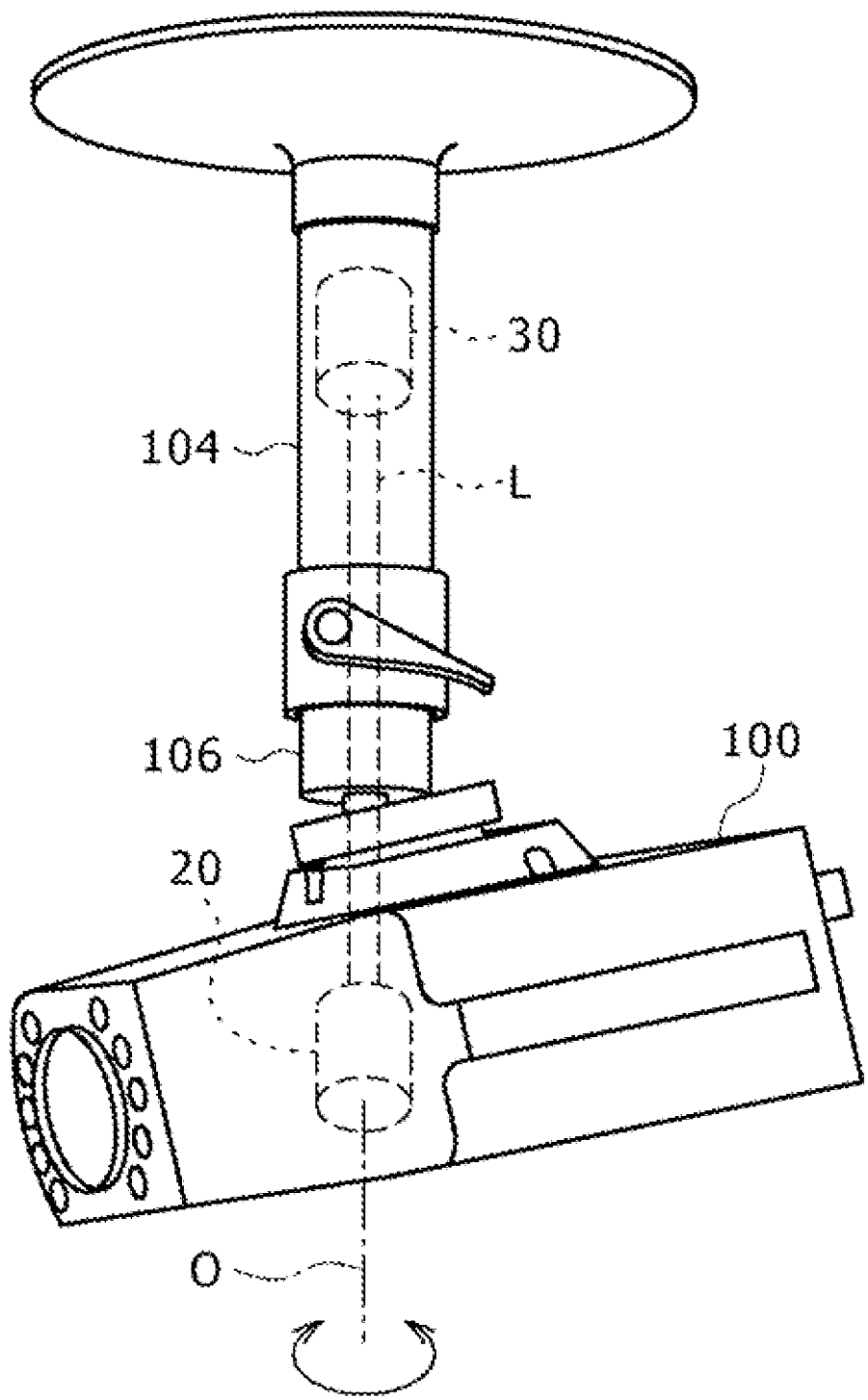
FIG. 21 is a perspective view showing the configuration of a monitoring camera according to another embodiment.

FIG. 21 is a diagram showing the configuration of a monitoring device 100 according to a second embodiment. The monitoring device 100 is attached to a ceiling plane in an indoor space or the like via an attachment 104 and used to image and record a specific photographic range in a store, an outdoor space, or the like. A rotational hinge unit 106 is interposed between the monitoring device 100 and the attachment 104. The rotational hinge unit 106 is rotationally driven by a drive unit (not shown) such as a motor, to thereby rotate the monitoring device 100 about an optical axis O.

A TOSA 20 is provided inside the monitoring device 100 and a ROSA 30 is provided inside the attachment 104. The ROSA 30 is disposed on the optical axis O of the laser light L emitted from the TOSA 20. Image data arising from imaging by an imaging unit (not shown) in the monitoring device 100 is supplied to the TOSA 20 via a serializer and so on. The TOSA 20 converts the image signal into an optical signal and transmits it to the ROSA 30. The ROSA 30 converts the optical signal received from the TOSA 20 into an electric signal and supplies it to a display device and a high-capacity storage such as a hard disk drive (HDD) provided at a predetermined position in the indoor space.

Although the monitoring device 100 is rotated in the above-described embodiment, the embodiment can be applied also to the case of expanding and contracting the attachment 104. In this case, the linear movement of basic operation (1) described for the first embodiment (see FIG. 2) can be employed. The ROSA 30 may be disposed on the backside of a ceiling. Moreover, if bending of the laser light L is desired, the above-described bending operation of basic operation (3) (see FIG. 4) can be employed.

As described above, in the present embodiment, the monitoring device 100 and the attachment 104 are connected to each other not by a wire line such as a cable but by optical wireless communication. This allows the monitoring device 100 to be infinitely rotated in the range of 360°. Thus, all directions in the indoor space can be easily imaged, which can enhance the safety.

Although the above-described embodiments relate to examples of application to the cellular phone 10 and the monitoring device 100, the embodiments of the present application can be applied also to personal computers, digital cameras, video cameras, game machines, scanners, and so on having a hinge unit and a slider unit.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An electronic apparatus comprising:
a light transmitting module configured to convert an electric signal into an optical signal and emit light;
a light receiving module configured to receive the light emitted from the light transmitting module and convert the optical signal into an electric signal;
a mover unit configured to cause at least one of the light transmitting module and the light receiving module to carry out (i) linear movement along an optical axis of the light emitted from the light transmitting module and (ii) rotation about the optical axis; and
a reflector provided between the light transmitting module and the light receiving module, wherein the reflector is configured to bend the light such that the light receiving module receives without substantial interruption the light transmitted by the light transmitting module when the mover unit causes one of the modules to linearly and rotationally move.

2. The electronic apparatus according to claim 1,
the reflector is disposed on an optical axis of the light transmitting module, and
the light receiving module is disposed on a second optical axis of the light reflected by the reflector.

3. The electronic apparatus according to claim 2, further comprising:
first and second cases configured to be slidably coupled with each other via a slider unit that is provided as a part of the mover unit and enables sliding along the optical axis of the light reflected by the reflector, wherein
the light transmitting module is provided in the first case,
the light receiving module is provided in the second case,
the reflector is provided in the second case, and
the light from the light transmitting module is received by the light receiving module via the reflector.

4. The electronic apparatus according to claim 3, wherein
a hinge unit that allows rotation about the optical axis is provided as a part of the mover unit,
the first and second cases are rotatably coupled with each other via the hinge unit,
the reflector is attached to the hinge unit, and
the second case is rotated via the hinge unit, and the light receiving module and the reflector rotate integrally with the second case in linkage with rotation of the second case.

5. The electronic apparatus according to claim 1, wherein the light transmitting module has a collimating lens for converting the light into collimated light.

6. The electronic apparatus according to claim 1, further comprising a display unit configured to display data transmitted within the optical signal from the light transmitting module to the light receiving module.

7. The electronic apparatus according to claim 1, further comprising a storage unit configured to store data transmitted within the optical signal from the light transmitting module to the light receiving module.

8. The electronic apparatus according to claim 2, wherein the optical axis intersects the second optical axis at the reflector.

* * * * *